United States Patent [19]

Wirth

[11] Patent Number: 5,285,860
[45] Date of Patent: Feb. 15, 1994

[54] CONTAINER SCALE

[75] Inventor: Johannes Wirth, Zurich, Switzerland

[73] Assignee: Wirth Gallo Messtechnik AG, Zurich, Switzerland

[21] Appl. No.: 849,056

[22] PCT Filed: Dec. 5, 1991

[86] PCT No.: PCT/CH91/00247
§ 371 Date: Apr. 27, 1992
§ 102(e) Date: Apr. 27, 1992

[87] PCT Pub. No.: WO92/11515
PCT Pub. Date: Jul. 9, 1992

[30] Foreign Application Priority Data

Dec. 17, 1990 [CH] Switzerland ............ 03 988/90-0

[51] Int. Cl.$^5$ .................. G01G 19/08; G01G 3/14
[52] U.S. Cl. .................. 177/139; 177/210 FP
[58] Field of Search .................. 177/139, 210 FP

[56] References Cited

U.S. PATENT DOCUMENTS

| | | | |
|---|---|---|---|
| 4,645,018 | 2/1987 | Garbade et al. | 177/139 X |
| 4,854,406 | 8/1989 | Appleton et al. | 177/139 |
| 4,947,694 | 8/1990 | Kirman et al. | 177/210 FP X |
| 5,004,392 | 4/1991 | Naab | 177/139 X |

Primary Examiner—George H. Miller, Jr.
Attorney, Agent, or Firm—Johnson & Gibbs

[57] ABSTRACT

Figure 1:
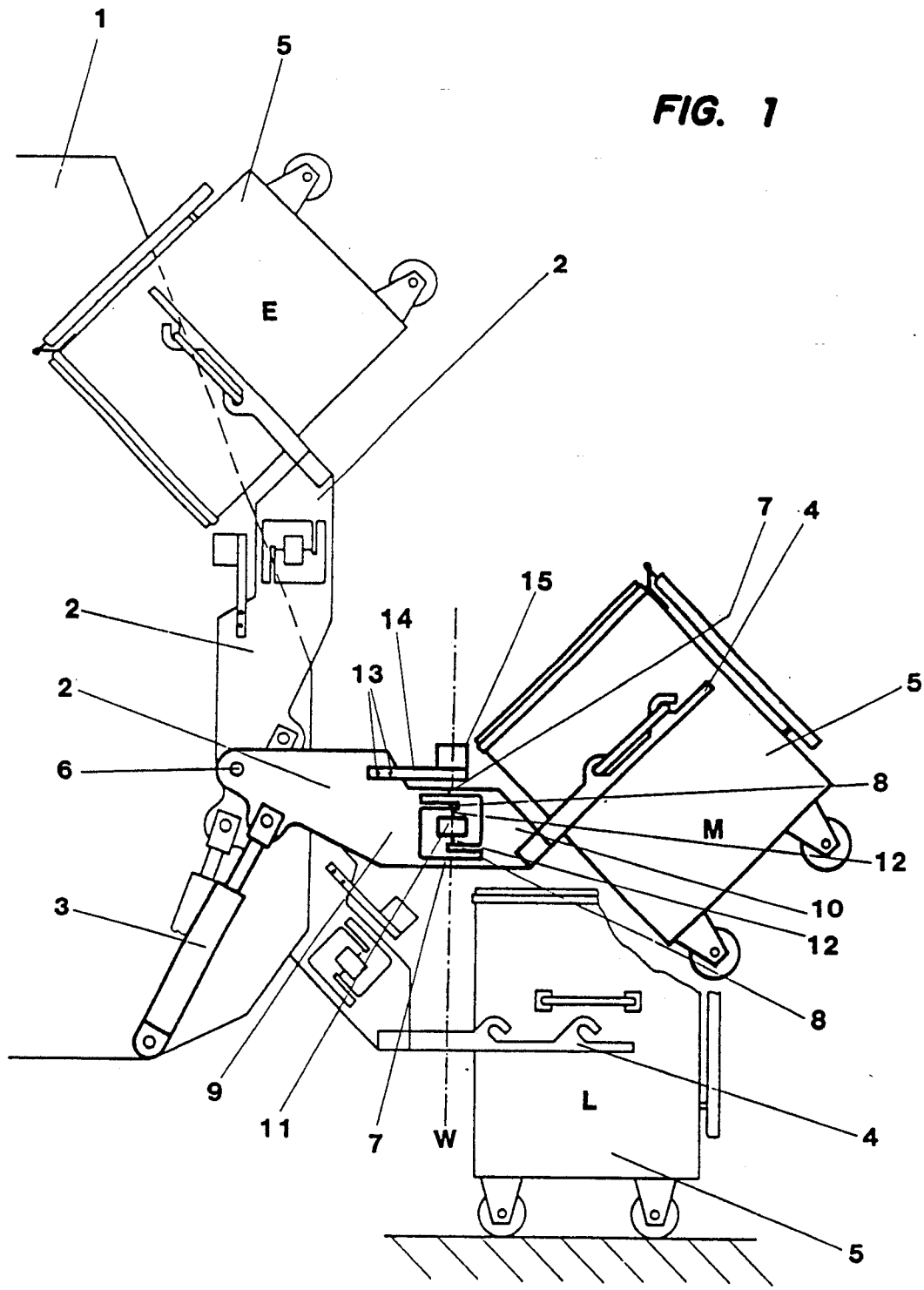

The present invention concerns a process and a device for carrying out the process for weight determination of the contents of containers (5), for example for garbage. Two swivel arms (2) that are lifted by hydraulic devices (3) are mounted on a garbage collecting vehicle (1). The container (5) is carried by a fork (4). Integrated into the swivel arm (2) is a force measuring apparatus that comprises two flexural members (7) supporting the main load, two spring tongues (8), and a force transducer (11) that is installed between two stilts (12) between the spring tongues (8). The flexural members (7) and the spring tongues together form an elastic stepdown; the force transducer (11) thus only measures that part of the total load flowing through it as given by the stepdown. Further, a gradient meter (16) is mounted on the swivel arm (2), that has the same action line W as the force measurement device integrated in the swivel arm (2). In this manner, the measurement of the weight of the container (5) is very extensively independent of the gradient. The weight of container (5) is calculated in known manner by two "total weight − tare = net" weighings. In order to exclude the influences of elastic prestresses, the angle range over which it is measured is limited to a preset degree. The container (5) is inserted in the fork (4) in the position L, position M is the measuring position, and the container (5) is emptied in position E (FIG. 1).

15 Claims, 3 Drawing Sheets

CONTAINER SCALE

The present invention concerns a weighing device that swivels around an approximately horizontal axis for use on hoisting equipment, such as metering equipment, foundry ladles, and hoisting or emptying equipment for containers.

Several apparatuses of the listed type are known. Numerous patents have been granted for weighing devices, such as, e.g., stacker trucks in which only the loads being transported and simultaneously weighed need to be hoisted; apparatuses are further known in which the whole vehicle including hoisting device is weighed. Garbage container scales, which are connected to a tilting device, are known from U.S. Pat. No. 4,854,406 and German Patent 3,819,169 A1. While the apparatus disclosed in the German patent 3,819,169 A1 belongs to the class of stacker truck weighing apparatuses, the U.S. Pat. No. 4,854,406, combined with a "total weight−tare=net weight" weight determination, teaches the use of a large number of apparatuses for the weight determination of a variety of garbage containers in which basically—as is shown from the data—a "total weight tare" weighing is performed. Two of the apparatuses depicted in this U.S. patent in principle measure a torsional moment; the measurement result therefore is dependent on the position of the center of gravity of the garbage container. One of the described apparatuses belongs in the class of stacker truck scales and in the weighing of tons of transportable garbage each apparatus is afflicted by undefinable frictional forces that are not measured simultaneously. An expensive operating concept with selected measuring positions defined by cam-actuated switches are common to all types. In rough operation, which predominates during the collection of garbage, malfunctions of the described apparatuses are obvious.

The object which must be achieved by the present invention comprises the creation of a weighing device with at least one swivel arm that will determine the weight of the container in normal operation of the unit in a suitable range independent of the position and movement.

The inventive concept, depending on several practical examples, will be explained in more detail with use of the attached drawing.

Figure 2:
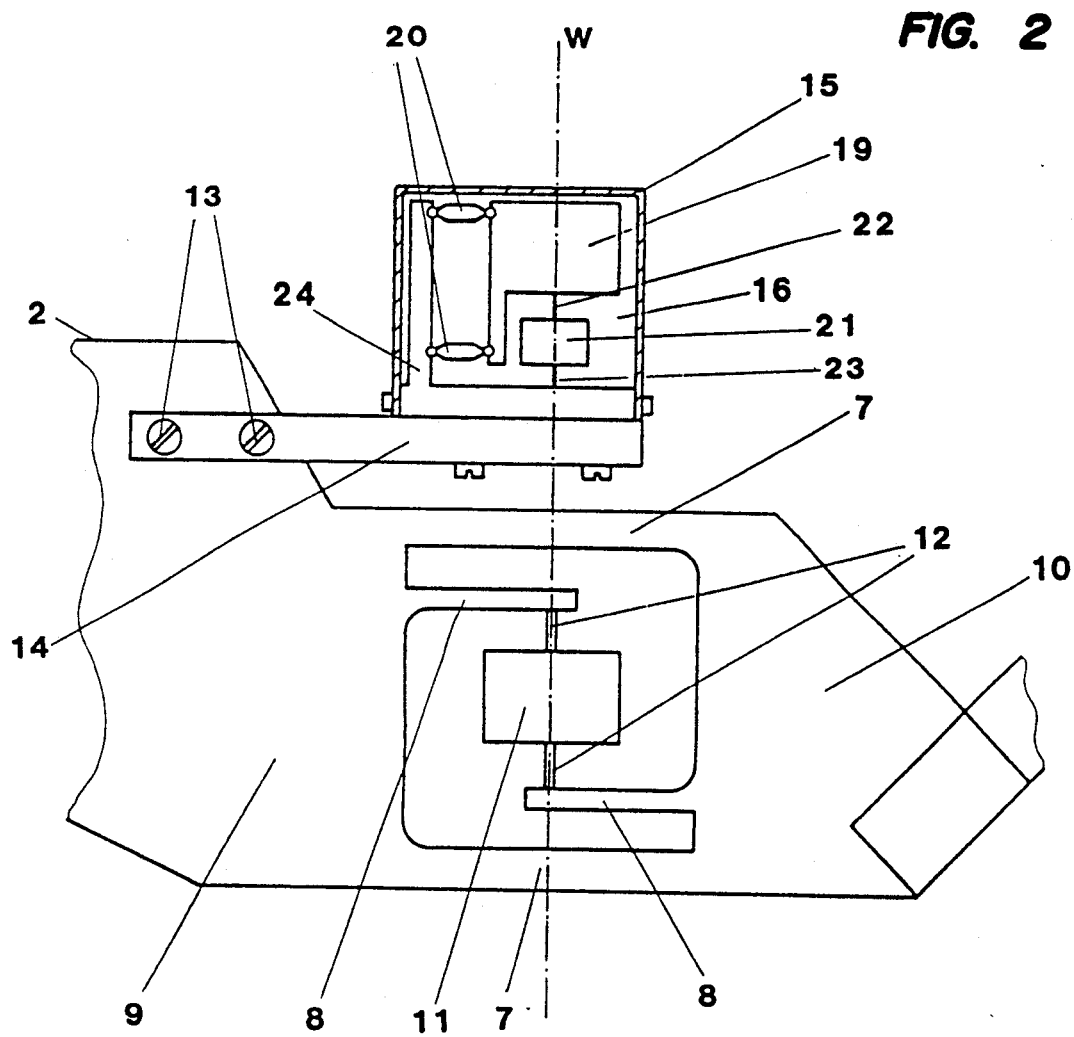
Figure 3A:
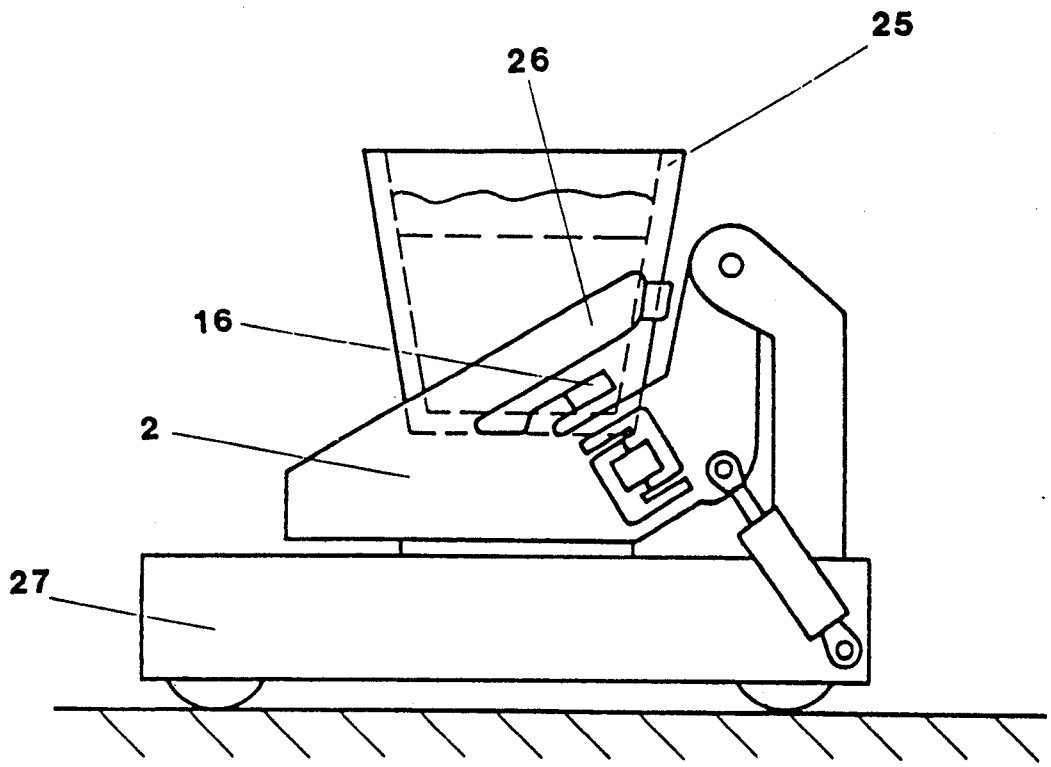
Figure 3B:
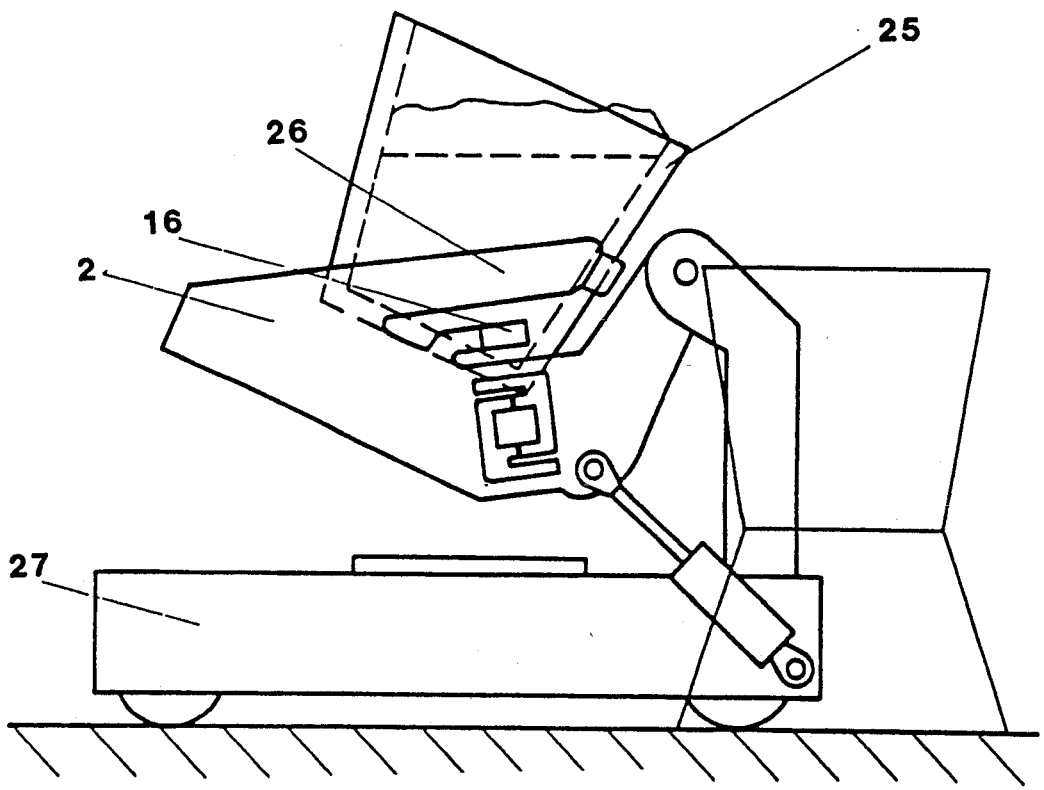

There are shown:

FIG. 1 two practical examples as container scales,

FIG. 2 a detail of the second practical example,

FIGS. 3a, 3b a third practical example as foundry ladle scale.

A loading, tilting, and emptying mechanism comprising a swivel arm 2 and a hydraulic cylinder 3 is mounted on a garbage collecting vehicle 1. Both the swivel arm and hydraulic cylinder are constructed in duplicate and are connected to both sides of the garbage collecting vehicle 1. A grab fork 4 is mounted on each swivel arm 2—as a rule rigidly. The grab fork for receipt of a portable container 5 is brought into an approximately horizontal position and the container 5 is introduced into the grab fork 4. Subsequently, the swivel arm 2 is swiveled on an axle 6 located on the garbage collecting vehicle 1 by increase of the operating pressure of the hydraulic cylinder 3 until the garbage falls out from the container 5. The specific designs of the garbage collecting vehicle 1 with regard to the sliding cover and the container 5 will not be described here since such designs do not involve the invention. This also applies in corresponding manner for the following practical examples.

A part 6 designed as a parallelogram is found on swivel arm 2 and is integrated into this. Two essentially parallel flexural members 7 form the primary springs for an elastic stepdown. The part of the swivel arm 2 lying between axle 6 and the flexural members 7 is designated as internal section 9 and the part lying between the flexible springs 7 and the grab fork 4 is designated as external section 10. The flexural members 7 support the main portion of the weight force engaging the forward end of the one grab arm (therefore, the weight of the container 5, the grab forks 4, and the external section 10). These load portions are designated hereafter by "load". Two spring tongues 8 forming the secondary springs of the cited elastic stepdown run essentially parallel to the flexural members 7; the upper spring tongue 8 in this practical example proceeds from the internal section 9 and the lower tongue proceeds from the external section 10. A force transducer 11 is installed between the spring tongues 8 by means of two stilts 12. Without limitation, the force transducer 11, for example, comprises a type with at least one laterally oscillating wire. As a result of the method of construction of the load measuring apparatus comprising the flexural members 7, the spring tongues 8, and the force transducer 11, only forces or force portions are measured that proceed in an action line designated by W. Also, the two stilts 12 lie in this action line W; the flexural members 7 and the spring tongues 8 proceed essentially perpendicular to the action line W. If the external section 10 is stressed, the flexural members 7 bend downward. In this manner, a tensile force now acts between the spring tongues 8, or, in case of prestressing by compression, this prestressing force now is reduced. The low intrinsic elasticity of the force transducer 11 is a component of the resilience of the spring tongues 8.

One variant of the drawn arrangement comprises the attachment of the upper spring tongue 8 to the external section 10 and the lower spring tongue 8 to the internal section 9. Then, a compressive force between the spring tongues 8 can cause a load on the external section 10.

In the emptying process, essentially three positions are differentiated. In the first position designated by L the container 5 is inserted into the grab fork 4. When it is subsequently lifted to such a height that it no longer contacts the ground, a force considerably lower than the load acts on the described load measuring device in the direction of the action line W. The measured force rises during the lifting process until it reaches its maximum at the position of swivel arm 2 designated by M; then, i.e., when the action line W coincides with the direction of the acceleration of gravity. Upon further lifting of the swivel arm 2, the measured force decreases.

The measuring process linked with the described practical example comprises a continuous determination of the force acting in the direction of the action line W during the swiveling process and a comparison of each measuring result to the foregoing result. The maximum result corresponds to the load. The same pattern is followed during lowering of swivel arm 2—after emptying of the container 5. The difference of the two maximum values corresponds to the net load, in other words, the weight of the emptied garbage. The electronic computer equipment necessary for the weight determination and sequence control is known per se and are not depicted here.

Obviously, the inventive concept includes the lifting of an initially empty container 5, charging it in the lifted position, for example, with a metering device, and subsequently lowering it again when full. The tare weighing then is accomplished initially and the total weighing subsequently.

Also, the inventive concept contains the summation of the measuring results from the two load measuring devices that are provided in a weighing device according to the invention with two swivel arms 2.

A second practical example of the inventive concept will be described by use of a part of FIG. 1 not mentioned previously, and in more detail by use of FIG. 2. A panel 14 that bears a schematically depicted case 15 is attached on the internal section 9 of the swivel arm 2, for example by means of screws 13. This case—as depicted in FIG. 2—contains an acceleration meter 16 having a frame 24 that, for example, is screwed onto the panel. The acceleration meter 16 comprises a standard weight 19 that is directed to the frame 24 by means of two essentially parallel guide bars 20. The component of the weight force of the standard weight 19 acting in the direction of the action line W presses on a force transducer 21 through a first stilt 22 that is supported on the frame 24 through an additional stilt 23. The two stilts 22, 23 located one under the other proceed along the same axis that also agrees with the direction of the action line W and the direction of the virtual movement of the standard weight 19. The force transducer 21 is preferably of the same type as the force transducer 11, therefore, however without limitation, of a type with at least one laterally oscillating wire. The dimensions of the panel 14 are such that the action lines W of the two force transducers 11, 21 coincide or at least are parallel. In this manner, as a result of the obligatory, identical inclination angle, the same fractions of the weight forces acting on them will be measured by the two force meters—therefore the acceleration meter 16 and the meter that is integrated in the swivel arm 2. The weight force of the standard weight 19 is normalized mathematically to the value "1" that corresponds to the vertical position of the action line W. Now, if the swivel arm 2 is rotated, or the garbage collecting vehicle 1 stands at an angle—in one or both axes—the ratio of the measured forces remains constant. Therefore, in this case it represents a true weighing in the sense of a weight comparison.

Since elastic prestressing forces can be accompanied by small deviations of the constancy of the weight ratios, it is suitable to limit the measuring range, for example, to an angle of ±20° with reference to the vertical direction of the action line W. This is achieved by setting limits for the measuring results of the acceleration meter 16. A limit of 0.940 with a normalization to 1.000 corresponds to a limitation of the measuring range of approximately ±20°.

The arrangement according to FIGS. 1 and 2 also has an advantage in that the acceleration states during tilting do not have to be considered. Further, it is mathematically possible by known means to extensively eliminate any effects of rockings that occur during operation.

The measuring process corresponding to the second practical example according to FIGS. 1 and 2 therefore depends on the formation of the ratio of the results of the two force measuring devices with limitation to a suitable angle range for example of ±20 to the vertical direction of the action line W. The weight calculation for the garbage is accomplished by a total weighing during lifting of the container 5 and a tare weighing upon lowering after emptying.

Also, in this process, the inventive concept includes summation of the measuring results of the two loading measuring devices that are provided with a weighing device with two swivel arms 2 according to the invention.

FIGS. 3a and 3b depict a third practical example. The swivel arm 2 with integrated loading measuring apparatus and the acceleration meter 16 in this case are a component of a lifting and tilting apparatus for foundry ladles that are mounted on an appropriate, schematically represented transport vehicle 27. The swivel arm 2 bears a fork 26 that receives a foundry ladle 25. The swivel arm 2 is tilted by hydraulic device 28 and thus the foundry ladle 25 is brought into operating position. In the same manner as in the first practical example, the swivel arm 2, hydraulic device 28, and the force meter integrated into the swivel arm are constructed in duplicate. Since the apparatus according to the invention only measures the forces parallel to the action line, displacements of the center of gravity that occur during pouring fall outside of consideration. The same certainly also applies for the other practical examples.

Also, a metering container that can receive or deliver dischargeable materials can be used in place of the foundry ladle 25.

A great advantage of the weighing apparatus according to the invention lies in that the swivel arm 2 of the various lifting apparatuses can be equipped or retrofitted easily and troublefree into the structure and mechanics of the swivel arms as long as the design takes this possibility into consideration from the outset.

Further, maintenance and replacement operations on the force meters are facilitated to a high degree in all cases since the swivel arms need not influence the design.

I claim:

1. Weighing device for a lifting apparatus for containers (5), which swivel on an approximately horizontal axis (6), with at least one swivel arm (2) and electronic devices for calculation and storage of the weighing results, characterized by the fact that the swivel arm (2) is integrated with a force measuring apparatus, through which the entire force flow of the swivel arm passes; this apparatus comprises essentially two parallel flexural members (7), which together form the primary spring of an elastic stepdown, and two spring tongues (8) lying one below the other parallel to the flexural members (7), which together form the secondary spring of the elastic stepdown; a force transducer (11) is installed between these spring tongues (8), whose force measuring direction defines an action line W, in which one spring tongue (8) is mounted on the swivel arm (2) on the axle part and the other spring tongue is mounted on the load-bearing part, the two flexural members (7) are components of the swivel arm (2) and thus are integrated therein so that they lie horizontally during a central operating position of the swivel arm (2), the force transducer (11) is installed between the spring tongues (8) in such manner that the force acting on it (therefore also the action line W), is perpendicular to the direction of the flexural members (7), to measure a vertically proceeding force in the central operating position of the swivel arm (2).

2. Weighing device according to Patent claim 1, characterized by the fact that the upper spring tongue (8) in the central operating position of the swivel arm (2), is mounted on the axle side of the swivel arm (2) and the lower spring tongue (8) is mounted on the load side.

3. Weighing device according to patent claim 1, characterized by the fact that the lower spring tongue (8) in the central operating position of the swivel arm (2) is mounted on the swivel arm (2) on the axle side and the upper spring tongue (8) is mounted on the load side.

4. Weighing device according to patent claim 1, characterized by the fact that the force transducer (11) is a force transducer with at least one laterally oscillating wire.

5. Weighing device according to one of the patent claims 1 through 4, characterized by the fact that the weighing device exhibits two parallel-operating swivel arms rotatable around the same axis (6).

6. Weighing device according to patent claim 5, characterized by the fact that the measuring results of the two force transducers (11) are added for calculation of the total weight.

7. Weighing device according to patent claim 1, characterized by the fact that an acceleration meter (16) is present and is attached to swivel arm (2), this acceleration meter (16) comprising a frame (21) on which a standard weight (19) is introduced in controlled path by means of two essentially parallel guide bars (20); the weight presses through a first stilt (22) onto a force transducer (21) that is supported on the frame (24) by a second stilt (23), the two stilts (22, 23) located one below the other lie in the same axis that also is the direction both of the virtual movement of the standard weight (19) and that of the action line W.

8. Weighing device according to patent claim 7, characterized by the fact that the force transducer (21) is a force transducer with at least one laterally oscillating wire.

9. Process for calculation of the weight of the contents of a container (5) lifted by a weighing device according to patent claim 1 and having at least one swivel arm (2), characterized by the fact that during the lifting process of the full container (5), the force acting on the force transducer (11) is measured continuously and is calculated and stored by the electronic computer, each measuring result is compared to the prior and successive results, the highest measured result is designated as the weight of the full container (5), after emptying of the container (5), the force acting on the force transducer (11) again is measured continuously and is calculated and stored by the electronic computer, each measuring result is compared to the prior and successive results, the highest measured result is designated as the weight of the empty container (5), the difference of the two highest results calculated in this manner is designated as the weight of the contents of the container (5) and is stored.

10. Process for calculation of the weight of the contents of a container (5) lifted by a weighing device according to patent claim 1 having at least one swivel arm (2), characterized by the fact that during the lifting process of the empty container (5), the force acting on the force transducer (11) is measured continuously and is calculated and stored by the electronic computer, each measuring result is compared to the prior and successive results, the highest measured result is designated as the weight of the empty container (5), after filling of the container (5) again the force acting on the force transducer (11) is measured continuously and is calculated and stored by the electronic computer, each measuring result is compared to the previous and the successive results, the highest measured result is designated as the weight of the full container (5), the difference of the two highest results calculated in this manner is designated as the weight of the contents of the container (5) and is stored.

11. Process for calculation of the weight of the contents of a container (5) lifted by a weighing device with at least one swivel arm (2) according to Patent claim 7, characterized by the fact that the weight of the standard weight (19) with flexural members (17) standing horizontally is normalized mathematically to 1.000, during the lifting process the ratio of the forces measured by the force transducer (11) of the load measuring apparatus and the force transducer (21) of the acceleration meter (16) is generated mathematically and the lifted load is calculated from this, after falling below a preset deviation from the value 1.000 for the measuring result of the acceleration meter (16), the mean is formed from a preset number of weighing results and the mean is stored as valid weight result, the difference of the valid weight results that are calculated and stored during lifting and lowering of the swivel arm (2), is generated; this corresponds to the weight of the contents of the container (5).

12. Process according to patent claim 11, characterized by the fact that, with the presence of two swivel arms (2), the sum of the results is generated.

13. Process according to patent claim 11, characterized by the fact that the preset deviation amounts to 0.040.

14. Process according to patent claim 11, characterized by the fact that the preset deviation amounts to 0.13.

15. Process according to patent claim 11, characterized by the fact that the preset deviation lies between 0.02 and 0.13.

* * * * *

UNITED STATES PATENT AND TRADEMARK OFFICE
CERTIFICATE OF CORRECTION

PATENT NO. : 5,285,860
DATED : February 15, 1994
INVENTOR(S) : Johannes Wirth

It is certified that error appears in the above-indentified patent and that said Letters Patent is hereby corrected as shown below:

Column 1, line 25: Change "weight tare" to --weight-tare--

Signed and Sealed this

Twenty-sixth Day of July, 1994

*Attest:*

BRUCE LEHMAN

*Attesting Officer*   *Commissioner of Patents and Trademarks*